US011349788B1

(12) United States Patent
Halasz et al.

(10) Patent No.: US 11,349,788 B1
(45) Date of Patent: May 31, 2022

(54) THIRD PARTY SYSTEM REPORTING ACTIONS PERFORMED THROUGH THE THIRD PARTY SYSTEM BY AN ONLINE SYSTEM USER IN RESPONSE TO MESSAGES RECEIVED BY THE ONLINE SYSTEM USER

(71) Applicant: Meta Platforms, Inc., Menlo Park, CA (US)

(72) Inventors: Csaba Halasz, San Carlos, CA (US); Adam Brice Flick, Menlo Park, CA (US); Yunfei Si, Newark, CA (US); Himanshu Baweja, Sunnyvale, CA (US); Mohit Rajani, San Francisco, CA (US); Markus Brunner, London (GB); Rohit Watve, Santa Clara, CA (US); Xiang Zhong, Mountain View, CA (US); Shuo Li, Redwood City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/695,649

(22) Filed: Nov. 26, 2019

(51) Int. Cl.
*G06F 15/16* (2006.01)
*H04L 51/046* (2022.01)
*G06Q 30/06* (2012.01)

(52) U.S. Cl.
CPC ....... *H04L 51/046* (2013.01); *G06Q 30/0635* (2013.01); *G06Q 30/0641* (2013.01)

(58) Field of Classification Search
CPC ........ H04L 51/02; H04L 51/32; H04L 51/046
See application file for complete search history.

(56) References Cited

U.S. PATENT DOCUMENTS

| 10,194,010 | B1 * | 1/2019 | Donohue | .......... H04M 1/27457 |
| 2013/0275862 | A1 * | 10/2013 | Adra | ....................... H04L 51/04 715/234 |
| 2014/0129622 | A1 * | 5/2014 | Michaeli | ............... G06F 16/954 709/203 |
| 2018/0103004 | A1 * | 4/2018 | Demir | ..................... H04L 51/32 |

* cited by examiner

*Primary Examiner* — Yves Dalencourt
(74) *Attorney, Agent, or Firm* — Fenwick & West LLP (57) ABSTRACT

An online system allows users to exchange messages with other users, including entities such as businesses. A user, such as a business, may use a third party system to manage messages with users of the online system. The online system provides the third party information with instructions comprising tracking mechanisms that identify specific actions between users from messages exchanged between users. For example, if a user purchases a product from another user via a message thread, a tracking mechanism identifies the purchase and transmits information reporting the purchase and identifying users to the online system. Hence, the tracking mechanism transmits a description of an action and information identifying the users to the online system, and may also transmit additional information, such as a value of the action to a user. The online system may use the descriptions of actions for content targeting or measurement and reporting of actions.

20 Claims, 3 Drawing Sheets

THIRD PARTY SYSTEM REPORTING ACTIONS PERFORMED THROUGH THE THIRD PARTY SYSTEM BY AN ONLINE SYSTEM USER IN RESPONSE TO MESSAGES RECEIVED BY THE ONLINE SYSTEM USER

BACKGROUND

This disclosure relates generally to a third party system reporting actions performed by users of an online system to the online system, and more specifically to a third party system reporting one or more specific actions performed by a user in response to one or more messages in a messaging thread between online system users to the online system.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users.

Additionally, many online systems allow their users to exchange messages via a network and the online system. An online system may provide an application for execution on client devices associated with online system users that allows the users to send messages to other users via the online system and to receive messages from other users via the online system. Further, many online system users allow other users to initiate actions by transmitting a message to an online system user. For example, a receiving user allows a sending user to purchase a product from the receiving user via a message that identifies the product and requests to purchase the product.

Allowing users to initiate actions by messaging another user simplifies interactions between online system users, and allows users to increase engagement with other users via messages; however, as many online systems are configured to prevent the online systems from accessing content of messages exchanged between users through the online systems to maintain user privacy, actions performed by online system users via a third party system external to the online system in response to messages prevents the users performing actions via the third party system from reporting the performed actions to an online system. For example, many online system users compose messages for transmission via the online system through a third party system and view messages received via the online system via the third party system. As the online system is unable to access content within messages between users, when a user initiates an action by another user via a message to the other user and the other user performs the action via a third party system, the online system cannot identify the action initiated by the user via a message. Because many online systems leverage information about user actions to select content for presentation to users or to identify users having performed specific actions, user actions initiated or performed in response to messages with another user are not identified to the online system, as the online system is configured to prevent to access content of the messages themselves and receives no information from conventional third party systems reporting actions performed by a user in response to receiving a message from another user via the online system.

SUMMARY

An online system allows users to exchange messages with each other. Messages exchanged between users include content comprising text data, image data, video data, audio data, or any combination thereof. Using an application executing on the client device and associated with the online system, a sending user provides content comprising a message to the online system along with an identifier of a receiving user to receive the message, and the online system communicates the message to the receiving user. Similarly, the sending user views content included in one or more messages from other users via the application executing on the client device.

The online system receives one or more messages from a sending user to a receiving user and communicates the received messages to the receiving user. Each message received by the online system includes an identifier of a sending user, an identifier of the receiving user and content. Additionally, the online system transmits messages received from a sending user to the receiving user. For example, the online system transmits a message received from the sending user to a third party system associated with the receiving user, while in other examples, the online system transmits a message received from the sending user to a client device that executes an application from a third party system. In other embodiments, the online system transmits a message from a sending user to a client device associated with the receiving user, and the client device transmits the message to a third party system. For example, the third party system is a third party application executing on a client device or on a third party system, allowing the receiving user to use an application or system separate from the online system to transmit messages to other users and to receive messages from sending users. In various embodiments, the receiving user is an entity, such as a business or another type of organization. Additionally, in various embodiments, the online system is configured to be unable to access content of messages transmitted between users via the online system. For example, the online system encrypts messages transmitted between users via any suitable end to end encryption method, allowing the users to access the message content, while preventing the online system or other entities from accessing message content.

Via the third party system, such as a third party application executing on a client device or on the third party system, the receiving user may generate messages to the sending user, such as messages in response to messages received from the sending user, and transmit the messages to the sending user via the online system. The online system receives messages from the receiving user and maintains an identifier of a thread of messages between the sending user and the receiving user. In response to one or more messages included in the thread between the sending user and the receiving user, the receiving user performs one or more actions. For example, in response to receiving a message from the sending user including specific words or phrases in the thread, the receiving user performs an action corresponding to the specific words or phrases. As an example, the receiving user includes a product identified by a message from the sending user in an online shopping cart in response to a message from the sending user including the product and including one or more specific words, such as "purchase," "buy," or "order." In another example, the receiving user creates or finalizes an order for a product in response to a message from the sending user identifying the product and including a word or phrase corresponding to purchasing the product. As another example, the receiving user includes information about a product in the thread in response to receiving a message from the sending user identifying the product and including a specific word or phrase corresponding to product information. While this allows the sending user to perform various actions, such as purchasing, adding items to a shopping cart, through on messages from the sending user to the receiving user, using the third party system for messaging with the sending user prevents the online system from receiving information about the actions performed by the sending user with the receiving user via the thread of messages, because the online system is configured to prevent access to content of messages in the thread of messages. This limits information available to the online system about actions between the receiving user and the sending user.

To identify actions between the receiving user and the sending user via the thread of messages, the online system provides a tracking mechanism to the third party system. The tracking mechanism comprises instructions that, when executed by the third party system, retrieve information identifying the receiving user and identifying the sending user and obtain a description of the action performed by the sending user based on an identified action performed by the receiving user. For example, the tracking mechanism comprises an application programming interface call included in a software development kit provided to the third party system by the online system. In various embodiments, the tracking mechanism identifies one or more specific actions, and when the receiving user performs an action matching a specific action identified by the tracking mechanism, the third party system obtains information identifying the receiving user, identifying the sending user, and describing the performed action. The tracking mechanism may cause the third party system to obtain additional information describing the performed action in various embodiments. For example, the third party system obtains a value, such as a monetary value, to the receiving user of the performed action when executing the tracking mechanism. Hence, the tracking mechanism identifies one or more actions by the sending user from an action performed by the receiving user in response to a message from the sending user in a thread of messages maintained by the online system and includes instructions that are executed by the third party system when the receiving user performs one or more of the actions identified by the tracking mechanism. Example actions identified by the tracking mechanism include adding a product to an online shopping cart, viewing content (e.g., a web page, a product, etc.), provided by the receiving user, adding a product to a list of products associated with the user by the receiving user, requesting information from the receiving user, subscribing to a service provided by the receiving user, and indicating a preference for content provided by the receiving user. However, in various embodiments, the tracking mechanism identifies any suitable action, so the instructions in the tracking mechanism may be executed when the receiving user performs any suitable interaction in response to a message from the sending user received via a thread including messages between the sending user and the receiving user via the online system. The tracking mechanism may identify one or more actions specified by the online system in various embodiments. Alternatively or additionally, the receiving user specifies one or more actions identified by the tracking mechanism, allowing the receiving user to customize actions that are identified by the tracking mechanism.

In some embodiments, the third party system includes different tracking mechanisms to identify different actions by the sending user via a message based on an action performed by the receiving user. For example, if the receiving user is an online merchant, the third party system includes a tracking mechanism that communicates information when the receiving user includes a product in a shopping cart for the sending user, includes another tracking mechanism that communicates information when the receiving user completes a sale of a product to the sending user, and another tracking mechanism when the receiving user includes content about a product in a message to the sending user. As another example, the third party system includes different tracking mechanisms that identify different types of content the receiving user transmits to the sending user via messages. Hence, the third party system may maintain different tracking mechanisms specifying different actions by the receiving user. Alternatively, the third party system maintains a common tracking mechanism that identifies different actions by the receiving user.

When the third party system receives an action by the receiving user matching an action specified by the tracking mechanism, the third party system executes instructions in the tracking mechanism that transmit information describing the action by the sending user in response to an action by the receiving user matching the action specified by the tracking mechanism, identifying the sending user, and identifying the receiving user to the online system. In various embodiments, additional information is also transmitted to the online system, such as a value (e.g., a monetary value) of the action to the receiving user, a time when the action was performed, or a product or a content item involved in the action. For example, after receiving the interaction matching the interaction specified by the tracking mechanism by the receiving user, the third party system executes instruction in the tracking mechanism that execute an application programming interface call (e.g., an application programming interface call provided in instructions from the online system) that transmits information from the third party system to the online system.

In various embodiments, information identifying the sending user obtained from the third party system executing the tracking mechanism is a third party specific user identifier generated by the online system and provided to the third party system by the online system. For example, when the third party system receives the message from the sending user to the receiving user, the online system generates a third party specific identifier that is transmitted to the third party system with the message. In various embodiments, the online system generates the third party specific identifier from an identifier of the thread including the message from the sending user, an identifier of the receiving user, a date and a time when the thread of messages between the sending user and the receiving user was created, and a name of the receiving user; however, in other embodiments, the online system generates the third party specific identifier from any suitable information, including a subset of the preceding example information. The online system stores the generated third party specific identifier with information identifying the thread of messages between the sending user and the receiving user (e.g., a unique thread identifier) and with an online system user identifier used by the online system to identify the sending user, allowing the online system to regulate access to information associated with the sending user and maintained by the online system by the third party system. The third party specific user identifier identifies the sending user to the third party system, allowing the third party system to uniquely identify the sending user without knowing the online system user identifier of the sending user. Hence, the third party system uses the third party specific identifier to identify the sending user, and the online system maintains information associating the third party specific identifier of the sending user with the online system user identifier of the sending user.

From information received from the third party system executing the tracking mechanism, the online system identifies the sending user. In various embodiments, the information received from the third party system includes a third party specific user identifier, as described above, and the online system identifies an online system user identifier corresponding to the third party specific user identifier from information stored by the online system. For example, the online system receives a third party specific user identifier and a thread identifier from the third party system via the tracking mechanism, and retrieves the online system user identifier associated with the combination of the third party specific user identifier and the thread identifier to identify the sending user.

Additionally, the online system identifies the receiving user from the information received from the third party system executing the tracking mechanism. For example, the tracking mechanism includes an online system user identifier of the receiving user in the information transmitted to the online system, and the online system extracts the online system user identifier of the receiving user from the information received from the tracking mechanism to identify the receiving user. The online system stores information describing the action by the sending user identified in the information received from the third party system executing the tracking mechanism in association with the sending user and in association with the receiving user. The online system may store additional information in conjunction with the description of the action in association with the online system user identifier of the sending user and in association with an online system user identifier of the receiving user. Additional information stored by the online system may be a value of the action to the receiving user (e.g., a monetary value of the action to the receiving user), a time when the action was performed, a product or a content item involved in the action, or any other suitable information.

Information stored by the online system describing actions by the sending user via messages to the receiving user may be used by the third party system to identify content for presentation to the sending user. For example, the receiving user, or another user, provides a content item to the online system including targeting criteria specifying a specific action by a user, and the online system accounts for one or more actions associated with the sending user via one or more tracking mechanism to evaluate the sending user against the targeting criteria. Hence, the tracking mechanism executed by the third party system allows identification of actions by the sending user via messages with the receiving user, without the online system having access to the messages between the sending user and the receiving user. This allows the online system to use actions performed by users via messages with other users based on information from the tracking mechanism executed by the third party system as characteristics used to identify users or groups of users eligible to be presented with additional content, or to otherwise identify groups of users having specific characteristics.

Additionally, the online system identifies actions performed by the sending user via messages with the receiving user when generating a report identifying different actions performed by users to the receiving user. For example, the online system increments a count of a specific action based on occurrences of the specific action identified by the third party system to the online system via the tracking mechanism. This allows the online system to more accurately identify and report actions relevant to the receiving user, as well as to maintain a more accurate and complete record of actions performed by the sending user. Additionally, the online system may use stored actions associated with the sending user received from the tracking mechanism executed by the online system as training data for one or more machine learning models, allowing the online system to more accurately train the machine learning models by accounting for actions performed by users via messages included in a message thread between users. For example, an action performed by the sending user via a message with the receiving user may be used as a label in conjunction with characteristics of the sending user that is used to train a model for predicting a likelihood of other users performing the action based on characteristics of the users.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
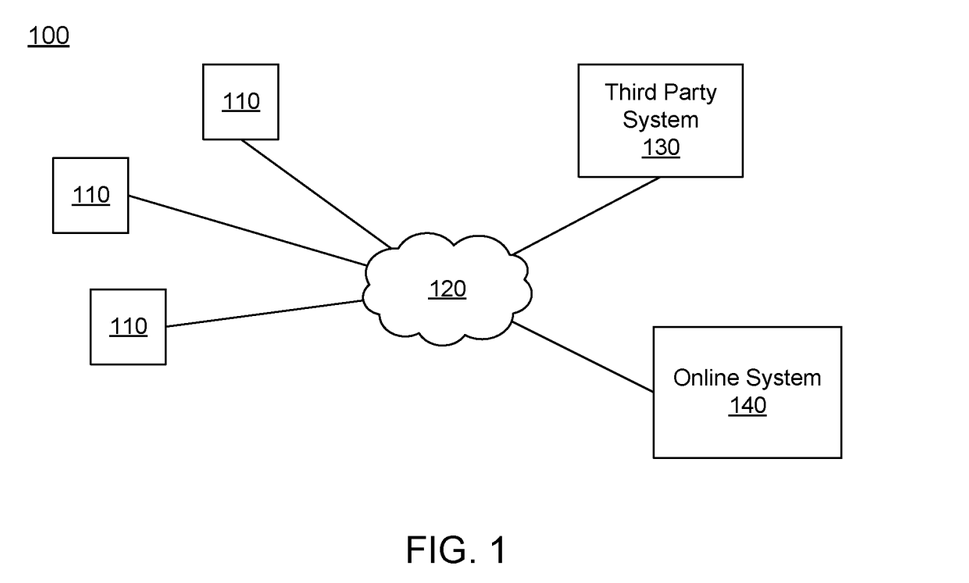
FIG. 1 is a block diagram of a system environment in which an online system operates, in accordance with an embodiment.

FIG. 1 is a block diagram of a system environment 100 for an online system 140.

The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

A client device 110 executes an application associated with the online system 140 that transmits messages from a user of the client device 110 to one or more receiving users of the online system 140 via the network 120 and the online system 140. The application also receives messages from other users of the online system 140 via the network 120 and displays the received messages to the user via a display device of the client device 110. To allow the user to more easily transmit and receive messages, the application groups messages into different threads, with a thread including messages associated with a common receiving user or with a common group of receiving users. Hence, different threads include messages associated with different receiving users. The application identifies different threads in different locations of an interface. For example, the application displays information identifying receiving users associated with different threads in different locations of the interface. The application also displays one or more sponsored content items in the interface along with information identifying threads.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device. In other embodiments, a third-party system 130 provides content or other information for presentation via a client device 110. A third-party system 130 may also communicate information to the online system 140, such as advertisements, content, or information about an application provided by the third-party system 130.

In various embodiments, a user of the online system 140 transmits to other users of the online system 140 and receives messages from other users of the online system 140 via a third party system 130. This allows the user to manage messaging between other users of the online system 140 via the third party system 130. Additionally, a user receiving a message from the online system 140 via the online system 140 may perform one or more actions by interacting with the third party system 130 in response to receiving a message from another user. As further described below in conjunction with FIG. 3, the third party system 130 may receive one or more tracking mechanisms from the online system 140 that identify specific actions by the user with the third party system 130 after receiving a message and transmit information identifying an action and identifying the users who exchanged messages when the third party system executes a tracking mechanism, allowing the online system 140 to receive information reporting actions performed in response to a user receiving a message, without the online system 140 having access to contents of the message.

Figure 2:
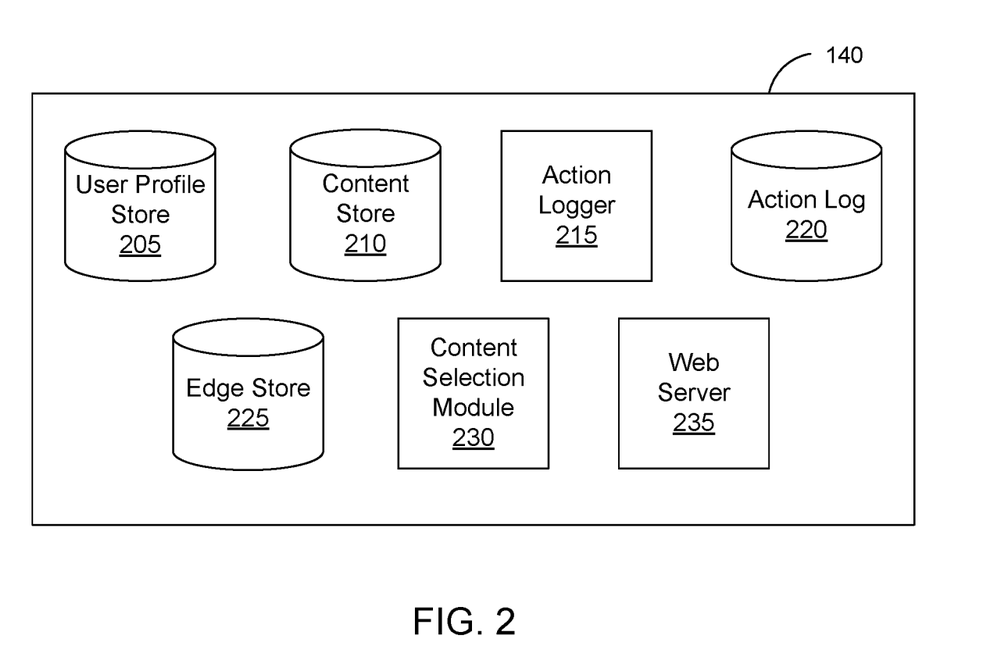
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 are "sponsored content items" that include content for presentation to a user and a bid amount. The content is text, image, audio, video, or any other suitable data presented to a user. In various embodiments, the content also specifies a page of content. For example, a sponsored content item includes a landing page specifying a network address of a page of content to which a user is directed when the content item is accessed. In some embodiments, a sponsored content item includes a link that, when selected by a user to whom the sponsored content item is displayed, performs an action. For example, a sponsored content item includes a link that, when selected by a user to whom the sponsored content item is displayed, launches an interface or an application through which the user enters and transmits a message to another user associated with the sponsored content item via the online system 140. The bid amount is included in a sponsored content item by a user and is used to determine an expected value, such as monetary compensation, provided by the user to the online system 140 if content in the sponsored content item is presented to a viewing user, if the content in the sponsored content item receives an interaction from the viewing user when presented, or if any suitable condition is satisfied when content in the sponsored content item is presented to a user. For example, the bid amount included in a sponsored content item specifies a monetary amount that the online system 140 receives from a user who provided the sponsored content item to the online system 140 if content in the sponsored content item is displayed. In some embodiments, the expected value to the online system 140 of presenting the content from the sponsored content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items, such as sponsored content items, may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item, such as a sponsored content item, may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions (or "interactions") internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a reaction to an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

As further described below in conjunction with FIG. 3, the content selection module 230 maintains an application programming interface (API) that includes one or more tracking mechanisms that the content selection module 230 transmits to one or more third party systems 130. A tracking mechanism comprises instructions that identify an action by a user, with the instructions executed by the third party system 130 in response to receiving an action from the user that match the identified action. Execution of the instructions by the third party system 130, causes the third party system to retrieve information identifying a user who received a message via the online system 140 (a "receiving user"), information identifying another user who sent the message to the receiving user (a "sending user") and obtain a description of the action. Hence, the tracking mechanism identifies an action by the sending user via a message based on an action performed by the receiving user in response to the message. Execution of the tracking mechanism further causes the third party system 130 to transmit information identifying the receiving user, information identifying the sending user, and the description of the action to the online system 140, where the action logger 215 stores the description of the action in association with the sending user and with the receiving user in the action log 220. In various embodiments, the tracking mechanism identifies one or more specific actions, and when the receiving user performs an action matching a specific action identified by the tracking mechanism, the third party system 130 obtains information identifying the receiving user, identifying the sending user, and describing the performed action. Use of the tracking mechanism by the third party system 130 is further described below in conjunction with FIGS. 3 and 4.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
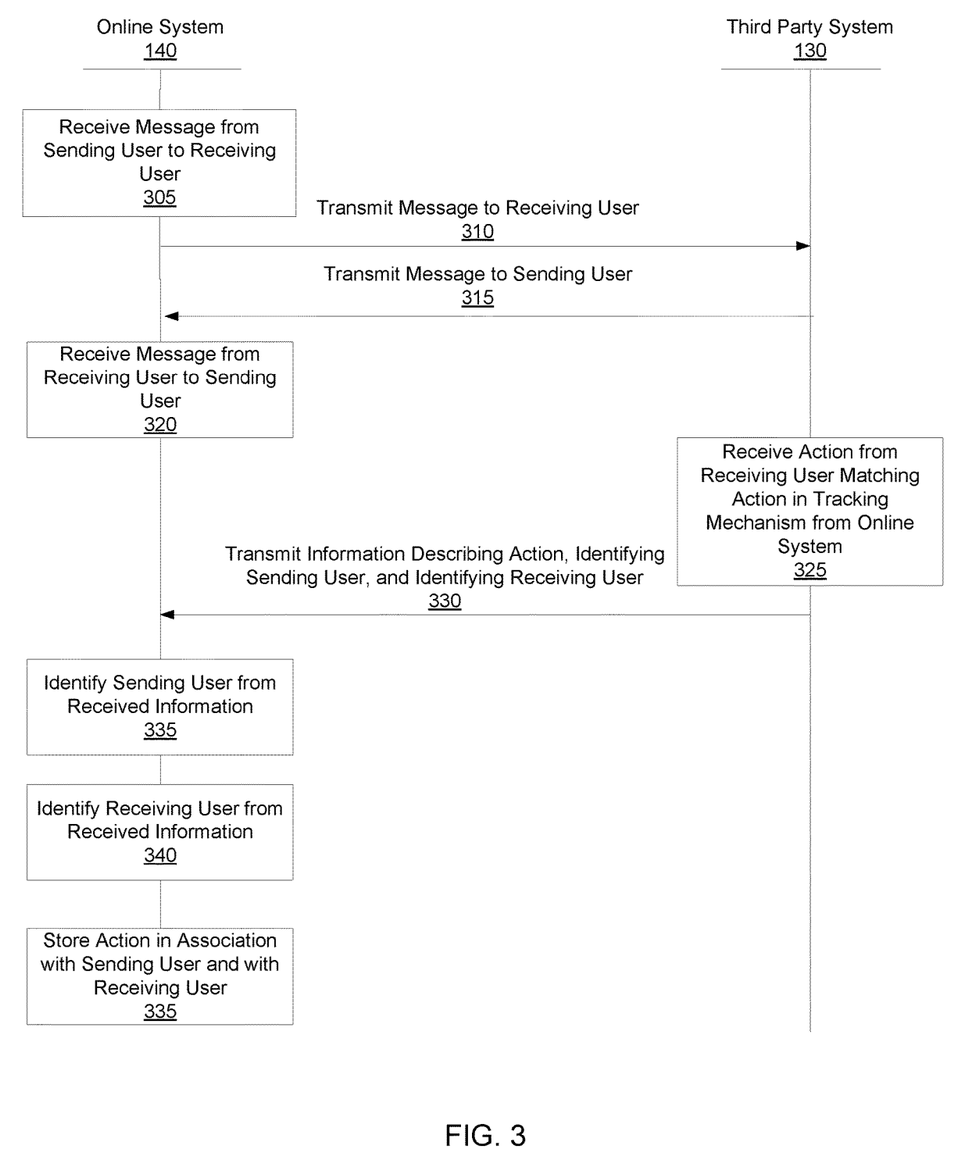
FIG. 3 is an interaction diagram of one embodiment of a method for a third party system reporting actions performed by an online system user from a message thread between a sending user and a receiving user, in accordance with an embodiment.

Reporting Actions from a Third Party System Performed by a User in Response to a Message Thread FIG. 3 is an interaction diagram of one embodiment of a method for a third party system 130 reporting actions performed by an online system user from a message thread between a sending user and a receiving user. In various embodiments, the method may include different or additional steps than those described in conjunction with FIG. 3. Additionally, in some embodiments, the method may perform the steps in different orders than the order described in conjunction with FIG. 3.

An online system 140, as further described above in conjunction with FIG. 2, allows users to exchange messages with each other. The online system 140 allows a user to transmit a message including content comprising text data, image data, video data, audio data, or any combination thereof to another user via the online system 140. Similarly, the online system 140 allows the other user to transmit a message to the user via the online system 140. Using an application executing on the client device 110 and associated with the online system 140, a user provides content comprising a message to the online system 140 along with an identifier of a receiving user to receive the message, and the online system 140 communicates the message to the receiving user. Similarly, the user views content included in one or more messages from other users via the application.

The online system 140 receives 305 one or more messages from a sending user to a receiving user and communicates the received messages to the receiving user. Each message received 305 by the online system 140 includes an identifier of a sending user, an identifier of the receiving user and content. In various embodiments, a message also includes a timestamp that identifies a time when the online system 140 received the message, while in other embodiments the timestamp identifies a time when a client device 110 that received the message from the sending user transmitted the message to the online system 140. In some embodiments, the online system 140 stores an encrypted or otherwise obfuscated copy of a received message in association with the sending user and in association with the receiving user, allowing the sending user or the receiving user to subsequently retrieve the message, while preventing the online system 140 from accessing the content of the message. Alternatively, the online system 140 stores an indication that a message for the receiving user was received from the sending user in association with the sending user and with the receiving user, but does not store the message or an obfuscated copy of the message.

The online system 140 transmits messages received 305 from a sending user to the receiving user. For example, the online system 140 transmits a message received 305 from the sending user to a third party system 130 associated with the receiving user, while in other examples, the online system 140 transmits 310 a message received 305 from the sending user to a client device 110 that executes an application from a third party system 130. In other embodiments, the online system 140 transmits a message from a sending user to a client device 110 associated with the receiving user, and the client device 110 transmits the message to a third party system 130. This allows the receiving user to use a third party system 130 to transmit and to receive messages from the sending user. In various embodiments, the receiving user is an entity, such as a business or another type of organization.

Via the third party system 130, the receiving user may generate messages to the sending user, such as messages in response to messages received from the sending user, and transmit 315 the messages to the sending user via the online system 140. The online system 140 receives 320 messages from the receiving user and maintains a thread of messages between the sending user and the receiving user. A message from the receiving user includes an identifier of the sending user, an identifier of the receiving user and content. In various embodiments, the message from the receiving user also includes a timestamp that identifies a time when the online system 140 received the message, while in other embodiments the timestamp identifies a time when the third party system 130 (or a client device 110) received the message from the receiving user transmitted the message to the online system 140. Hence, the online system 140 creates a thread of messages between the sending user and the receiving user, with the thread identifying the sending user and the receiving user. In various embodiments, the thread also includes obfuscated copies of messages between the sending user and the receiving user, and vice versa, allowing the sending user and the receiving user to retrieve messages from the thread using different or multiple client devices 110, while preventing the online system 140 from accessing content of the messages within the thread. In various embodiments, the online system 140 stores obfuscated or encrypted copies of messages between the sending user and the receiving user in the thread, allowing retrieval of the messages by the sending user and the receiving user, while preventing the online system 140 from accessing content of the messages. Alternatively, the online system 140 stores indications identifying times when messages were sent between the sending user and the receiving user, allowing the online system 140 to maintain the thread of messages, while preventing the online system 140 from accessing content included in the messages themselves because of one or more configuration settings of the online system 140.

In response to one or more messages included in the thread between the sending user and the receiving user, the receiving user performs one or more actions. For example, in response to receiving a message from the sending user including specific words or phrases, the receiving user performs an action corresponding to the specific words or phrases. As an example, the receiving user includes a product identified by a message from the sending user in an online shopping cart in response to a message from the sending user including the product and including one or more specific words. In another example, the receiving user creates or finalizes an order for a product in response to a message from the sending user identifying the product and including a word or phrase corresponding to purchasing the product. As another example, the receiving user includes information about a product in the thread in response to receiving a message from the sending user identifying the product and including a specific word or phrase corresponding to product information. While this allows the receiving user to perform various actions based on messages from the sending user, using the third party system 130 for messaging with the sending user prevents the online system 140 from receiving information about the actions performed by the sending user with the receiving user via the thread of messages, as the online system 140 is configured to prevent the online system 140 from accessing content of messages between the sending user and the receiving user. For example, the receiving user uses a third party application executing on a client device 110 or on the third party system 130 to send and to receive messages via the online system 140. Such a third party application 130 may allow the receiving user to send and to receive messages via the online system 140, while also allowing the receiving user to perform other actions, such as actions related to purchasing products or providing content. Hence, a sending user may transmit messages to and receive messages from the receiving user via an application associated with the online system 140 (e.g., an application in a common domain as the online system 140), while the receiving user uses the third party application to receive messages from and to transmit messages to the sending user. The third party application is in a domain different then a domain of the online system 140, so the third party application does not provide information to the online system 140 or receive information from the online system 140 other than messages to the receiving user. While this allows the receiving user greater flexibility in transmitting and receiving messages to otherer users via the online system 140, a third party application unrelated to the online system 140 does not transmit the online system 140 reporting or describing actions performed by the sending user or by the receiving user in response to messages sent or received by users via a thread of messages. This limits information available to the online system 140 about actions between the receiving user and the sending user because of the configuration of the online system 140 preventing the online system 140 from accessing content of messages between the sending user and the receiving user.

To identify actions between the receiving user and the sending user via the thread of messages, the online system 140 provides a tracking mechanism to the third party system 130. The tracking mechanism comprises instructions that, when executed by the third party system 130, retrieves information identifying the receiving user and identifying the sending user and obtains a description of the action performed by the sending user based on an identified action performed by the receiving user. For example, the tracking mechanism comprises an application programming interface call included in the application from a software development kit provided to the third party system 130 by the online system 140. In various embodiments, the tracking mechanism identifies one or more specific actions, and when the receiving user performs an action matching a specific action identified by the tracking mechanism, the third party system 130 obtains information identifying the receiving user, identifying the sending user, and describing the performed action. The tracking mechanism may cause the third party system 130 to obtain additional information describing the performed action in various embodiments. For example, the third party system 130 obtains a value, such as a monetary value, to the receiving user of the performed action when executing the tracking mechanism. For example, an application associated with the third party system 130, which is in a domain separate than a domain of the online system 140, executes an API call comprising the tracking mechanism in response to the application receiving an action from the receiving user matching a specific action identified by the tracking mechanism, so the third party application obtains information identifying the receiving user, identifying the sending user, and describing the performed action. Hence, the tracking mechanism identifies one or more actions by the sending user from an action performed by the receiving user in response to a message from the sending user and includes instructions that are executed by the third party system 130 when the receiving user performs one or more of the actions identified by the tracking mechanism.

Example actions identified by the tracking mechanism include adding a product to an online shopping cart, viewing content (e.g., a web page, a product, etc.), provided by the receiving user, adding a product to a list of products associated with the user by the receiving user, requesting information from the receiving user, subscribing to a service provided by the receiving user, and indicating a preference for content provided by the receiving user. However, in various embodiments, the tracking mechanism identifies any suitable action, so the instructions in the tracking mechanism may be executed when the receiving user performs any suitable interaction in response to a message from the sending user. The tracking mechanism may identify one or more actions specified by the online system in various embodiments. Alternatively or additionally, the receiving user specifies one or more actions identified by the tracking mechanism, allowing the receiving user to customize actions that are identified by the tracking mechanism.

In some embodiments, the third party system 130 includes different tracking mechanisms to identify different actions by the sending user via a message based on an action performed by the receiving user. For example, if the receiving user is an online merchant, the third party system 130 includes a tracking mechanism that communicates information when the receiving user includes a product in a shopping cart for the sending user, includes another tracking mechanism that communicates information when the receiving user completes a sale of a product to the sending user, and another tracking mechanism when the receiving user includes content about a product in a message to the sending user. As another example, the third party system 130 includes different tracking mechanisms that identify different types of content the receiving user transmits to the sending user via messages. Hence, the third party system 130 may maintain different tracking mechanism specifying different actions by the receiving user. Alternatively, the third party system 130 maintains a common tracking mechanism that identifies different actions by the receiving user.

When the third party system 130 receives 325 an action by the receiving user matching an action specified by the tracking mechanism, the third party system 130 executes instructions in the tracking mechanism that transmit 330 information describing the action by the sending user in response to an action by the receiving user matching the action specified by the tracking mechanism, identifying the sending user, and identifying the receiving user to the online system 140. In various embodiments, additional information is also transmitted 330 to the online system 140, such as a value (e.g., a monetary value) of the action to the receiving user, a time when the action was performed, or a product or a content item involved in the action. For example, after receiving 325 the interaction matching the interaction specified by the tracking mechanism by the receiving user, the third party system 130 executes instruction in the tracking mechanism that execute an application programming interface call (e.g., an application programming interface call provided in instructions from the online system 140) that transmits 320 information from the third party system 130 to the online system 140.

In various embodiments, information identifying the sending user obtained from the third party system 130 executing the tracking mechanism is a third party specific user identifier generated by the online system 140 and provided to the third party system 130 by the online system 140. For example, when the third party system 130 receives 305 the message from the sending user to the receiving user, the online system 140 generates a third party specific identifier that is transmitted to the third party system 130 with the message. In various embodiments, the online system 140 generates the third party specific identifier from an identifier of the thread including the message from the sending user, an identifier of the receiving user, a date and a time when the thread of messages between the sending user and the receiving user was created, and a name of the receiving user; however, in other embodiments, the online system 140 generates the third party specific identifier from any suitable information, including a subset of the preceding example information.

The online system 140 stores the generated third party specific identifier with information identifying the thread of messages between the sending user and the receiving user (e.g., a unique thread identifier) and with an online system user identifier used by the online system 140 to identify the sending user, allowing the online system 140 to regulate access to information associated with the sending user and maintained by the online system by the third party system 130. The third party specific user identifier identifies the sending user to the third party system 130, allowing the third party system 130 to uniquely identify the sending user without knowing the online system user identifier of the sending user. Hence, the third party system 130 uses the third party specific identifier to identify the sending user, and the online system 140 maintains information associating the third party specific identifier of the sending user with the online system user identifier of the sending user. Generation of a third party specific user identifier and association of the third party specific user identifier with an online system user identifier is further described in U.S. Pat. No. 10,187,483, filed on Aug. 12, 2014, which is hereby incorporated by reference in its entirety.

From information received from the third party system 130 executing the tracking mechanism, the online system 140 identifies 335 the sending user. In various embodiments, the information received from the third party system 130 includes a third party specific user identifier, as described above, and the online system 140 identifies 335 an online system user identifier corresponding to the third party specific user identifier from information stored by the online system 140. For example, the online system 140 receives a third party specific user identifier and a thread identifier from the third party system 130 via the tracking mechanism, and retrieves the online system user identifier associated with the combination of the third party specific user identifier and the thread identifier to identify 335 the sending user. Identification of an online system user identifier from a third party specific user identifier is further described in U.S. Pat. No. 10,187,483, filed on Aug. 12, 2014, which is hereby incorporated by reference in its entirety.

Additionally, the online system 140 identifies 340 the receiving user from the information received from the third party system 130 executing the tracking mechanism. For example, the tracking mechanism includes an online system user identifier of the receiving user in the information transmitted 330 to the online system 140, and the online system 140 extracts the online system user identifier of the receiving user from the information received from the tracking mechanism to identify 340 the receiving user. The online system 140 stores 345 information describing the action by the sending user identified in the information received from the third party system 130 executing the tracking mechanism in association with the sending user and in association with the receiving user. In various embodiments, the online system 140 stores 345 a description of the action in association with an online system user identifier of the sending user and in association with an online system user identifier of the receiving user in an action log 215, as further described above in conjunction with FIG. 2. The online system 140 may store additional information in conjunction with the description of the action in association with the online system user identifier of the sending user and in association with an online system user identifier of the receiving user. Additional information stored by the online system 140 may be a value of the action to the receiving user (e.g., a monetary value of the action to the receiving user), a time when the action was performed, a product or a content item involved in the action, or any other suitable information.

Information stored 345 by the online system 140 describing actions by the sending user via messages to the receiving user may be used by the third party system 130 to identify content for presentation to the sending user. For example, the receiving user, or another user, provides a content item to the online system 140 including targeting criteria specifying a specific action by a user. As a specific example, the receiving user provides an advertisement request ("ad request") to the online system 140 including content for presentation to online system users and including targeting criteria specifying an action of including a product in an online shopping cart. Based on the stored information reporting actions by the sending user, which includes actions by the sending user identified by the tracking mechanism executed by the third party system 130, the online system determines that the sending user previously included in the product in an online shopping cart, when the user included the product in the online shopping cart via a message to the receiving user. This allows the online system 140 to determine that the sending user is eligible to be presented with the content from the ad request. by users with content provided by the third party system 130 when the sending user included the product in an online shopping cart via messages exchanged with the receiving user. Hence, the tracking mechanism executed by the third party system 130 allows identification of actions by the sending user via messages with the receiving user, without the online system 140 having access to the messages between the sending user and the receiving user. Hence, the online system 140 may use actions performed by users via messages with other users based on information from the tracking mechanism executed by the third party system 130 as characteristics used to identify users or groups of users eligible to be presented with additional content, or to otherwise identify groups of users having specific characteristics.

Additionally, the online system 140 identifies actions performed by the sending user via messages with the receiving user when generating a report describing different actions performed by users to the receiving user. For example, the online system 140 increments a count of a specific action based on occurrences of the specific action identified by the third party system 130 to the online system 140 via the tracking mechanism. This allows the online system 140 to more accurately identify and report actions relevant to the receiving user, as well as to maintain a more accurate and complete record of actions performed by the sending user. Additionally, the online system 140 may use stored actions associated with the sending user received from the tracking mechanism executed by the online system 140 as training data for one or more machine learning models. For example, an action performed by the sending user via a message with the receiving user may be used as a label in conjunction with characteristics of the sending user that is used to train a model for predicting a likelihood of other users performing the action based on characteristics of the users. This allows the online system 140 to better optimize various machine learning models by allowing the online system 140 to account for actions that users perform via message threads with other users, providing additional information to the online system 140 that improves accuracy of the machine learning models in predicting likelihoods of users performing various actions.

Figure 4:
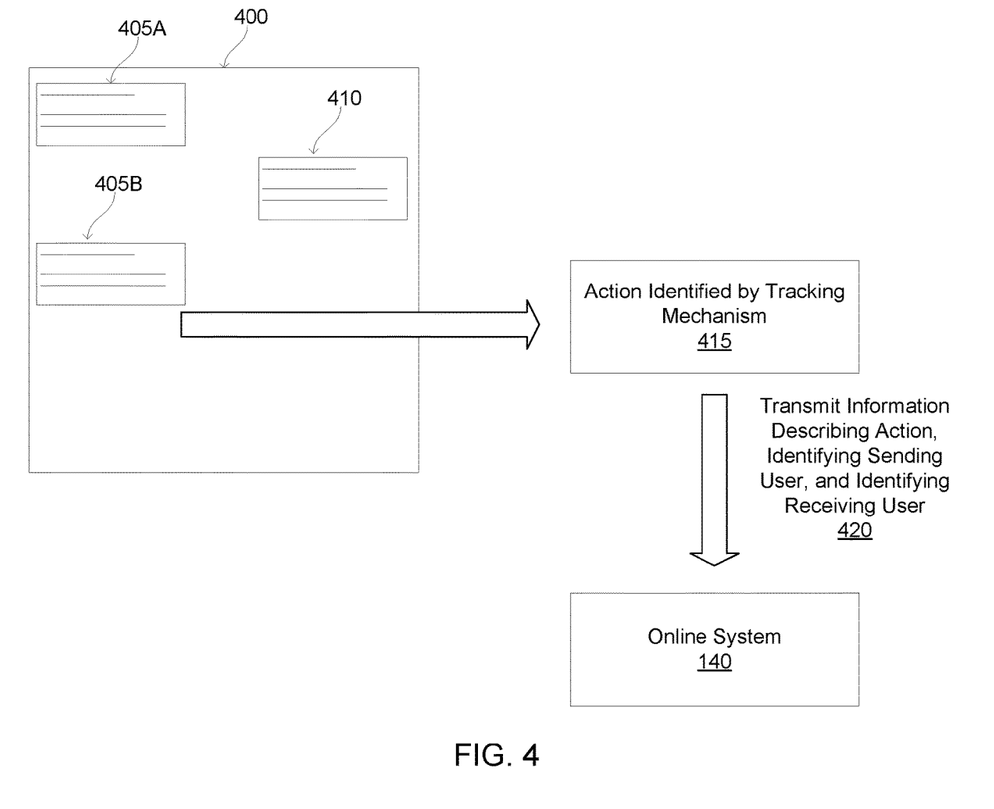
FIG. 4 is a process flow diagram of a third party system reporting an action by a sending user to an online system from an action performed by a receiving user in response to a message from the sending user, in accordance with an embodiment.

FIG. 4 is a process flow diagram of a third party system 130 reporting an action by a sending user to an online system from an action performed by a receiving user in response to a message from the sending user. FIG. 4 shows an example thread 400 of messages 405A, 405B from a sending user to a receiving user and message 410 from the receiving user to the sending user. The sending user and the receiving user are users of an online system 140, such as a social networking system or a messaging system, that allows the sending user and the receiving user to exchange messages with each other. The online system 140 stores an identifier of the thread 400 to identify the exchange of messages between the sending user and the receiving user. In some embodiments, the online system 140 also stores encrypted or obfuscated copies of messages 405A, 405B, and message 410, allowing the sending user and the receiving user to retrieve messages 405A, 405B and message 410 from the online system 140, while preventing the online system 140 from accessing the content of the messages 405A, 405B and message 410. Alternatively, the online system 140 stores a time and a date when messages 405A, 405B and message 410 were received, so the online system 140 identifies when different messages were received from the sending user and from the receiving user, while preventing the online system 140 from accessing content of the messages 405A, 405B, 410 themselves.

As further described above in conjunction with FIG. 3, the receiving user may use a third party system 130 to view messages from the sending user and to transmit messages to the sending user. FIG. 4 depicts the thread 400 from the third party system 130, with messages 410A, 405B and message 410 visible. In response to specific words or phrases in a message from the sending user, the receiving user performs one or more actions, allowing the sending user to initiate action by the receiving user via a message to the receiving user. For example, the receiving user includes a product identified in a message from the sending user in an online shopping cart in response to receiving a message from the sending user identifying the product and including the words "purchase" or "order." While this simplifies interaction between the sending user and the receiving user, use of the third party system 130 by the receiving user to receive and send messages to the sending user prevents the online system 140 from storing information describing actions the sending user performs with the receiving user via messages from the sending user. This limits information describing actions performed by different users stored by the online system 140, which may subsequently impair selection of content for presentation to users or identification of users having performed certain actions.

To allow the online system 140 to store information describing actions between users performed via messages because configuration of the online system 140 prevents the online system 140 from accessing content within the messages, the online system 140 provides the third party system 130 with one or more tracking mechanisms. As further described above in conjunction with FIG. 3, a tracking mechanism comprises instructions that, when executed by the third party system 130, retrieves information identifying the receiving user and identifying the sending user and obtains a description of the action performed by the sending user based on an identified action performed by the receiving user. For example, the tracking mechanism comprises an application programming interface call included in a software development kit provided to the third party system 130 by the online system 140. In various embodiments, the tracking mechanism identifies one or more specific actions, and when the receiving user performs an action matching a specific action identified by the tracking mechanism, the third party system 130 obtains information identifying the receiving user, identifying the sending user, and describing the performed action and transmits the obtained information to the online system 140.

In the example of FIG. 4, the receiving user performs an action 415 identified by a tracking mechanism from the online system 140 in response to message 405B from the sending user. Hence, the third party system 130 through which the receiving user exchanges messages with the sending user executes the tracking mechanism and transmits 420 a description of the action, information identifying the sending user, and information identifying the receiving user to the online system 140. The third party system 130 may transmit 420 additional information about the action, such as a product identified by the action or a value of the action to the receiving user, to the online system 140 in some embodiments. As further described above in conjunction with FIG. 3, the online system 140 stores the description of the action in association with the sending user and with the receiving user, allowing the online system 140 to identify an action by the sending user via a message 405A, 405B based on the corresponding action taken by the receiving user. Hence, the online system 140 may store information describing actions the sending user performs via messages 405A, 405B to the receiving user without accessing the content of the messages 405A, 405B themselves, increasing privacy of the sending user while also allowing the online system 140 to maintain more comprehensive information about user actions.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
maintaining, at an online system, a thread of one or more messages between a sending user of the online system and a receiving user of the online system transmitted through the online system, the thread identifying the sending user and the receiving user and including obfuscated copies of the one or more messages preventing the online system from accessing content of the one or more messages;
receiving, at the online system, information from a third party system in which the receiving user generates messages to the sending user, the third party system in a domain different than a domain of the online system, the information received from a tracking mechanism the third party system obtained from the online system, the tracking mechanism comprising instructions that, when executed by the third party system, cause the third party system to:
determine an action performed by the receiving user via the third party system in response to one or more messages in the thread between the sending user and the receiving user matches a specific action included in the tracking mechanism, the specific action associating an item provided by the receiving user with the sending user via the third party system;
obtain the information from the third party system comprising information identifying the sending user, information identifying the receiving user, and an action by the sending user via the one or more messages of the thread corresponding to the action taken by the receiving user via the third party system in response to one or more messages in the thread;
identifying, by the online system, the sending user from the received information from the third party system describing one or more actions by the sending user of the online system with the receiving user of the online system;
identifying, by the online system, the receiving user from the received information describing from the third party system describing one or more actions by the sending user of the online system with the receiving user of the online system; and
storing information at the online system describing the action by the sending user corresponding to the action taken by the receiving user via the third party system in association with the sending user and in association with the receiving user.

2. The method of claim 1, wherein the information received from the third party system describing one or more actions by the sending user of the online system with the receiving user of the online system includes a value of an action to the receiving user.

3. The method of claim 1, wherein from the third party system describing one or more actions by the sending user of the online system with the receiving user of the online system includes a product included in an action.

4. The method of claim 1, wherein the one or more actions are defined by the receiving user.

5. The method of claim 1, wherein the one or more actions are defined by the online system.

6. The method of claim 1, wherein identifying, by the online system, the sending user from the received information from the third party system describing one or more actions by the sending user of the online system with the receiving user of the online system comprises:
identifying a third party specific user identifier from the received information from the third party system;
identifying a thread identifier including the messages between the sending user and the receiving user from the received information; and
retrieving an online system user identifier associated with the third party specific user identifier and with the tread identifier by the online system.

7. The method of claim 1, wherein the specific action is selected from a group consisting of: adding a product to an online shopping cart, viewing content provided by the receiving user, adding a product to a list of products associated with the sending user by the receiving user, requesting information from the receiving user, subscribing to a service provided by the receiving user, and any combination thereof.

8. A method comprising:
receiving one or more messages from a sending user of an online system to a receiving user of the online system at a third party system in a domain different than a domain of the online system;
receiving instructions at the third party system from the online system that, when executed by the third party system, cause the third party system to:
identify, by the third party system, an action performed by the receiving user via the third party system in response to a message from the sending user to the receiving user received by the third party system that matches a specific action included in the instructions, the specific action associating an item provided by the receiving user with the sending user via the third party system;
transmit information from the third party system describing an action by the sending user of the online system via the one or more messages with the receiving user of the online system that corresponds to the identified action performed by the receiving user of the online system via the third party system, identifying the sending user, and identifying the receiving user from the third party system to the online system in response to the identifying by the third party system of the action by the receiving user.

9. The method of claim 8, wherein the information describing the action by the sending user of the online system based on the identified action, identifying the sending user, and identifying the receiving user further identifies a value of the identified action to the receiving user.

10. The method of claim 8, wherein the information describing the action by the sending user of the online system based on the identified action, identifying the sending user, and identifying the receiving user further identifies a product associated with the identified action.

11. The method of claim 8, wherein the action by the receiving user is specified by the online system.

12. The method of claim 8, wherein the action by the receiving user is specified by the receiving user.

13. The method of claim 8, wherein the specific action is selected from a group consisting of: adding a product to an online shopping cart, viewing content provided by the receiving user, adding a product to a list of products associated with the sending user by the receiving user, requesting information from the receiving user, subscribing to a service provided by the receiving user, and any combination thereof.

14. The method of claim 8, wherein the information identifying the sending user comprises a third party specific user identified received from the online system in conjunction with a message from the sending user and a thread identifier of a thread including the one or more messages from the sending user to the receiving user.

15. A computer program product comprising a non-transitory computer readable storage medium having instructions encoded thereon that, when executed by a processor, cause the processor to:
   maintain, at an online system, a thread of one or more messages between a sending user of the online system and a receiving user of the online system transmitted through the online system, the thread identifying the sending user and the receiving user and including obfuscated copies of the one or more messages preventing the online system from accessing content of the one or more messages;
   receive, at the online system, information from a third party system in which the receiving user generates messages to the sending user, the third party system in a domain different than a domain of the online system, the information received from a tracking mechanism the third party system obtained from the online system, the tracking mechanism comprising instructions that, when executed by the third party system, cause the third party system to:
      determine an action performed by the receiving user via the third party system in response to one or more messages in the thread between the sending user and the receiving user matches a specific action included in the tracking mechanism, the specific action associating an item provided by the receiving user with the sending user via the third party system;
      obtain the information from the third party system comprising information identifying the sending user, information identifying the receiving user, and an action by the sending user via the one or more messages of the thread corresponding to the action taken by the receiving user via the third party system in response to one or more messages in the thread;
   identify, by the online system, the sending user from the received information from the third party system describing one or more actions by the sending user of the online system with the receiving user of the online system;
   identify, by the online system, the receiving user from the received information describing from the third party system describing one or more actions by the sending user of the online system with the receiving user of the online system; and
   store information at the online system describing the action by the sending user corresponding to the action taken by the receiving user via the third party system in association with the sending user and in association with the receiving user.

16. The computer program product of claim 15, wherein the information received from the third party system describing one or more actions by the sending user of the online system with the receiving user of the online system includes a value of an action to the receiving user.

17. The computer program product of claim 15, wherein from the third party system describing one or more actions by the sending user of the online system with the receiving user of the online system includes a product included in an action.

18. The computer program product of claim 15, wherein the one or more actions are defined by the receiving user.

19. The computer program product of claim 15, wherein the one or more actions are defined by the online system.

20. The computer program product of claim 15, wherein identify, by the online system, the sending user from the received information from the third party system describing one or more actions by the sending user of the online system with the receiving user of the online system comprises:
   identify a third party specific user identifier from the received information from the third party system;
   identify a thread identifier including the messages between the sending user and the receiving user from the received information; and
   retrieve an online system user identifier associated with the third party specific user identifier and with the tread identifier by the online system.

* * * * *

UNITED STATES PATENT AND TRADEMARK OFFICE
CERTIFICATE OF CORRECTION

PATENT NO. : 11,349,788 B1
APPLICATION NO. : 16/695649
DATED : May 31, 2022
INVENTOR(S) : Csaba Halasz et al.

It is certified that error appears in the above-identified patent and that said Letters Patent is hereby corrected as shown below:

In the Claims

In Column 23, Claim 3, Line 64, delete "wherein from the" and insert -- wherein the --, therefor.

In Column 26, Claim 17, Lines 22-23, delete "wherein from the" and insert -- wherein the --, therefor.

Signed and Sealed this
Fifteenth Day of November, 2022

Katherine Kelly Vidal
*Director of the United States Patent and Trademark Office*